United States Patent Office 3,462,997
Patented Aug. 26, 1969

3,462,997
LIQUID METAL MONITORS
Peter Francis Roach, Warrington, and Daniel Fraser Davidson, Altrincham, England, assignors to United Kingdom Atomic Energy Authority
Continuation-in-part of application Ser. No. 492,378, Oct. 4, 1965. This application Mar. 20, 1967, Ser. No. 624,387
Claims priority, application Great Britain, Oct. 26, 1964, 43,659/64; Mar. 29, 1966, 43,731/66
Int. Cl. G01n *11/00*
U.S. Cl. 73—61      6 Claims

ABSTRACT OF THE DISCLOSURE

A liquid metal monitor for estimating an impurity in a liquid metal stream and having an orifice in a liquid metal flow path, which orifice can be at least partially plugged by precipitate from liquid metal in the flow path. At the orifice, liquid metal flow is divided into two parts so that subsequently one of the parts passes through and the other part bypasses, the orifice. The liquid metal stream upstream of the orifice is maintained in counter-current heat transfer relationship with, but separate from, the stream passing through the orifice to prevent complete plugging of the orifice.

Cross reference to related application

This patent application is a continuation-in-part of applicants' co-pending application Ser. No. 492,378 filed Oct. 4, 1965, for Liquid Metal Monitors now Patent No. 3,390,571.

Background of the invention

This invention relates to liquid metal monitors used for estimating the impurity content (mainly oxygen) in a liquid metal stream. The invention is concerned with monitors known as "plugging meters." Such meters rely on the fact that there is a known relationship between temperature and the solubility of the impurity in the liquid metal. The temperature is measured at which impurity begins to precipiate or at which it begins to redissolve, that is to say, the saturation temperature. A flow of hot liquid metal is established through a cooler and then through an orifice. If the temperature of the liquid passing through the orifice is progressively reduced while the flow rate is continuously measured a reduction in flow indicates that the orifice is being partially blocked or "plugged," by particles of impurity. The liquid metal temperature at the orifice when plugging is apparent only approximates to the saturation temperature if the cooling is slow. As a consequence an unplugging run is carried out (where the temperature of the liquid through the partially blocked orifice is slowly raised) to obtained a second temperature reading (of "unplugging") which is used with the first temperature reading to give a mean temperature which is taken as the true saturation temperature.

A continuous indication of saturation temperature could be obtained if the temperature at the orifice were controlled so that the flow is a fixed fraction of the unplugged flow. In practice this is difficult to do, either manually or by automatic control, because of certain undesirable characteristics in the control loop. A reduction in flow due to plugging is accompanied immediately, without changing the rate of cooling, by a reduction in temperature at the outlet of the cooler. This causes a control overshoot which the operator, or control system, has to try to correct for by reducing the rate of cooling. If a time lag exists between the controller altering the cooling rate and sensing cooler outlet temperature, an undesirable "hunting" can occur between cooling rate alteration and temperature sensing.

Summary of the invention

The present invention resides in a liquid metal monitor having an orifice for a liquid metal flow path, which orifice can be at least partly plugged by precipitate from liquid metal in the flow path, and cooling means to enable liquid metal upstream of the orifice to be cooled, the monitor being characterised in that at the orifice, means are provided for dividing the liquid metal flow into two streams so that subsequently one of the streams passes through, and the other stream bypasses, the orifice.

The bypass stream may provide that changes of flow through the plugging orifice do not cause corresponding changes through the cooling means. Should complete plugging of the orifice accidentally occur, a continuous supply of fresh liquid metal passes the orifice to dissolve the plug.

Re-entrant flow means may be provided so that liquid metal in the flow-path prior to the division of flow into two streams is separate from but in good heat transfer relationship with that stream of liquid metal which passes through the orifice. Such a monitor can be operated so that the orifice temperature is self limiting and tends to a means value (termed saturation temperature) at which, for a given impurity level limit, material is neither being precipitated onto, nor dissolved from, a partial plug in the orifice.

Description of the drawings

Embodiments of the invention will now be described, by way of example only, with reference to the accompanying drawings (FIGURES 1 and 2) which are diagrammatic views of liquid metal circuits showing the manner in which the monitor of the present invention may be employed.

Description of the preferred embodiments

Figure 1:
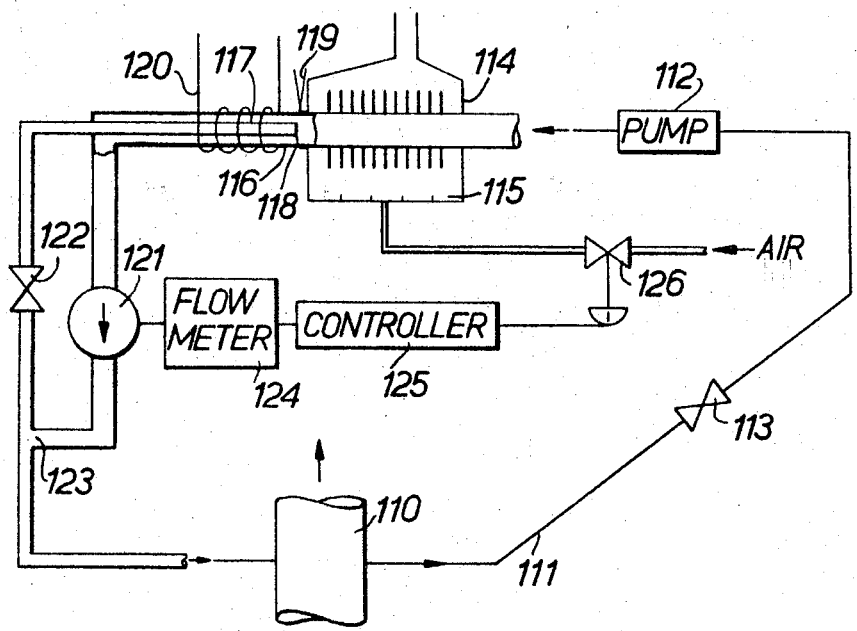

FIGURE 1 of the drawings shows a liquid metal monitor for sampling a liquid metal in a main 110. A continuous liquid metal sample is drawn along line 111 by pump 112 through a valve 113. The sample is thereafter driven through a cooler 114 which is externally finned and cooled by a flow of cold air from vents 115. The sample then passes through a first tube 116 which carries coaxially within at a second tube 117 which defines an annular orifice 118. The first tube 116 is surrounded, beyond the orifice 118, by a heater 120. A thermocouple 119 is provided to measure the temperature of the sample at the orifice 118. The sample is split into two parts at the orifice and then continues as separate, but coaxial streams. The first stream is that which passes through the orifice 118 and then through a flowmeter head 121. The second stream is that which passes through the second tube 117 and then through a valve 122. The two streams rejoin at the junction 123 to form a single flow which is then returned to the main 110. The signal output from the flowmeter head 121 passes to flowmeter 124 and therefrom a control signal is passed to a valve controller 125 which governs the flow of cooling air on output from vents 115 by way of valve 126.

In operation, flow fluctuations in the line 111 caused by varying metal flow in the main 110 are smoothed by having the valve 113 acting as a strong restriction and the pump 112 set for delivering a high pressure. This arrangement ensures a steady flow through the cooler 114. A sample drawn from the main 110 by the pump 112 is driven through the cooler 114 where its temperature is progressively lowered by cold air blown over the fins. On arriving at the orifice 118 the flow splits into the two streams. The first stream, passing through the orifice 118, will precipitate solid matter therein if the sample has been cooled sufficiently (to at least saturation temperature) in the cooler 114. The resultant partial blockage of the orifice will disturb the flow through the flow meter head 121 and when such disturbance occurs the temperature registered by the thermocouple 119 is noted automatically (by means not shown). As previously mentioned this temperature at which precipitation occurs is a measure of the amount of impurities present in the sample. The flow head 121 supplies information to the meter 124 and the controller 125. As long as no blockage occurs at the orifice the valve 126 is controlled to cause increased cooling of the sample through the cooler 114. When partial blockage does eventually occur the air flow is reduced to allow the temperature of the liquid metal to rise so as to clear the blockage. The heater 120 warms the stream after the orifice to ensure that the orifice region is the coolest place in the system and consequently the only place where precipitation and blocking will occur. The second stream, passing through the second tube 117, passes on through the valve 122 which acts as a constriction to allow a split into the two substantially equal streams at the orifice. The streams mix at junction 123 and are then restored to the main 110.

Figure 2:
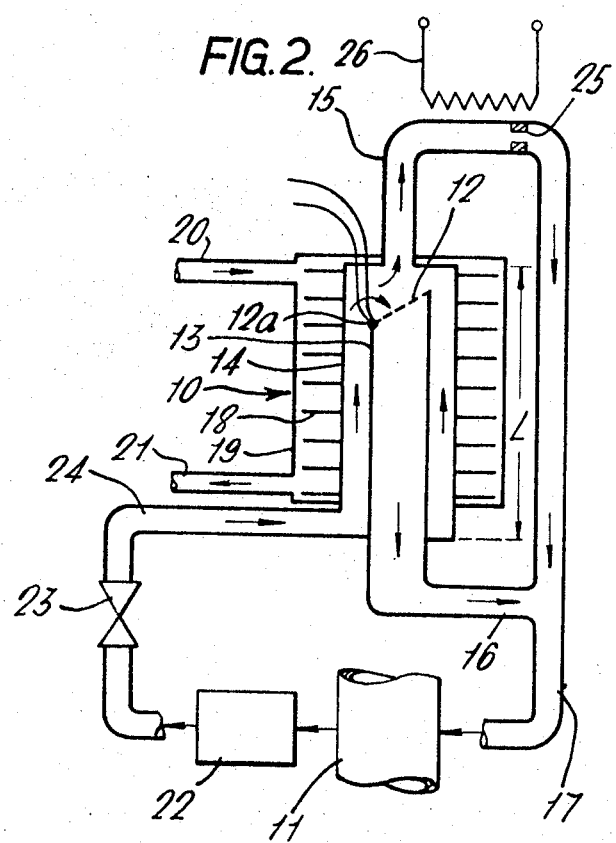

FIGURE 2 of the drawings shows a liquid metal monitor 10 for liquid sodium metal in a main 11. Liquid metal is withdrawn from the main 11 by a pump 22 and is driven through a flow restrictor 23 before passing by way of a line 24 into an outer tube 14 of the monitor 10. The monitor 10 has an orifice plate 12 carrying a thermocouple junction 12a situated at one end of a second, inner tube 13 which is mounted coaxially within the outer tube 14 so that liquid flows in the tubes are separated but in good heat exchange relationship with each other over a re-entrant length L. A bypass tube 15 is provided at one end of the outer tube 14 so that liquid metal passing through the outer tube 14 can split into two streams at the orifice plate 12. The opposite end of the inner tube 13 to the having the orifice plate 12 rejoins the bypass tube 15 at a T-junction 16, the combined flows being thereafter returned to the main 11 by way of a line 17. The outer tube 14 is provided with external cooling vanes 18 which are surrounded by a jacket 19 which has an inlet 20 and an outlet 21 for a secondary coolant flow. A flow restrictor 25 is provided in the bypass tube 15 downstream of a heater element 26. The impedance to flow offered by the restrictor 23 is high compared with impedance offered by the restrictor 25 in the bypass tube 15 in order to obtain a fairly constant total flow through the monitor 10.

In operation, the pump 22 is used to draw liquid sodium from the main 11 and drive it through the flow restrictor 23 into the outer tube 14 by way of the line 24. At the upper end of the outer tube 14 the flow splits into two parts (one part passing on through bypass tube 15.) Before any plug has started to form, the flow through the orifice plate 12 is approximately 90% of the total flow. Heat is extracted from liquid metal in the outer tube 14 by circulation of a secondary coolant such as air through the jacket 19 by way of the inlet 20 and the outlet 21. The temperature of liquid metal up to the orifice 12 tends to fall to a designed value T. This temperature T is chosen so as to be below the saturation temperature ($T_{sat}$) of a limiting value of oxide impurity in the liquid sodium. As the temperature T is approached (through $T_{ast}$) a plug begins to form and partially blocks the orifice plate 12. As this partial plugging occurs flow through the inner tube 13 decreases and heat transfer from liquid metal in the outer tube 14 to liquid metal in the inner tube 13 falls. As a consequence the temperature of liquid metal passing through the orifice 12 rises and the plug material starts to redissolve. (The part of the flow passing through the bypass tube 15 is warmed continuously by the heater 26 to avoid plugging of the bypass restrictor 25). Removal of the partial plug due to rise in temperature of liquid metal results in increased flow through the inner tube 13, increased heat removal from liquid metal in outer tube 14 and renewed precipitation of oxide to form a plug at the orifice 12. The temperature derived from the thermocouple 12a thus tends to fluctuate about a mean value which corresponds to $T_{sat}$ for the desired oxide limit. Since the flow of secondary coolant and the pumping rate of the pump 22 can be maintained independently constant, the monitor, after initial calibration for a specified limiting oxide content for the sodium, requires no controlling mechanism and the conventional circuitry associated with thermocouple 12a only needs to serve an indicative function.

We claim:
1. A liquid metal monitor comprising a first tube defining an inlet liquid metal flow path, a second tube and a bypass tube linked to the first tube to define, respectively, an outlet liquid metal flow path and a bypass liquid metal flow path in parallel with the outlet liquid metal flow path, an orifice at the entrance to the second tube, means for detecting the temperature of liquid metal at the orifice, cooling means for liquid metal in the first tube and means for indicating disturbance in liquid metal flow rate through the orifice.

2. A liquid metal monitor as claimed in claim 1 wherein the second tube is a continuation of the first tube and the bypass tube is mounted coaxially within the second tube to define an annular orifice between the second tube and the bypass tube.

3. A liquid metal monitor as claimed in claim 1 wherein the portion of the second tube adjacent the orifice is mounted coaxially within the first tube in counter flow heat exchange relationship therewith.

4. A liquid metal monitor having an orifice for a liquid metal flow path, which orifice can be at least partially plugged by precipitate from liquid metal in the flowpath, and cooling means to enable liquid metal upstream of the orifice to be cooled, wherein the orifice serves for dividing the liquid metal flow into two streams so that one of the streams passes through, and the other stream bypasses, the orifice; and further including means for maintaining liquid metal upstream of the orifice in good counter-current heat transfer relationship with, but separate from, the stream of liquid metal which passes through the orifice.

5. A liquid metal monitor according to claim 4, wherein in a variable flow restrictor is provided in the liquid metal flow path upstream of the cooling means.

6. A liquid metal monitor according to claim 5, wherein a flow restrictor is provided in the liquid metal flow stream which bypasses the orifice.

References Cited

UNITED STATES PATENTS

| | | | |
|---|---|---|---|
| 2,997,874 | 8/1961 | Billuris et al. | 73—61 |
| 3,200,637 | 8/1965 | Ballou et al. | 73—61 |
| 3,222,916 | 12/1965 | Davis | 73—15 |
| 3,340,725 | 9/1967 | Wilkinson | 73—61 |
| 3,343,401 | 9/1967 | Delisle | 73—61 X |

LOUIS R. PRINCE, Primary Examiner

JOSEPH W. ROSKOS, Assistant Examiner

U.S. Cl. X.R.

73—15